(12) United States Patent
Hiramatsu

(10) Patent No.: US 9,280,842 B2
(45) Date of Patent: Mar. 8, 2016

(54) DATA DISPLAY APPARATUS, METHOD AND PROGRAM, AND DATA STRUCTURE AND RECORDING MEDIUM

(71) Applicant: FUJIFILM Corporation, Tokyo (JP)

(72) Inventor: Hiroshi Hiramatsu, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 306 days.

(21) Appl. No.: 13/972,542

(22) Filed: Aug. 21, 2013

(65) Prior Publication Data

US 2014/0055459 A1    Feb. 27, 2014

(30) Foreign Application Priority Data

Aug. 24, 2012    (JP) .................................. 2012-185401

(51) Int. Cl.
G06T 11/20    (2006.01)

(52) U.S. Cl.
CPC .................................... *G06T 11/206* (2013.01)

(58) Field of Classification Search
CPC ....... G06F 19/3475; G06F 8/38; G06T 11/20; G06T 11/206; G06T 2200/24
See application file for complete search history.

(56) References Cited

FOREIGN PATENT DOCUMENTS

JP    H 6-83880 A    3/1994

*Primary Examiner* — Maurice L McDowell, Jr.
*Assistant Examiner* — Raffi Isanians
(74) *Attorney, Agent, or Firm* — McGinn IP Law Group, PLLC

(57) ABSTRACT

When plural datasets each composed of a set of numerical value data respectively corresponding to plural values on a variable axis common to the datasets are displayed on a display screen, they are displayed in a display mode of a graph mode or a table mode in such a manner that they are vertically arranged with a horizontal axis representing the variable axis coinciding with each other. An input of instruction for switching the display mode for at least one of plural partial display areas in which the datasets are displayed is received. The partial display area for which the input of instruction has been received is set so that its height becomes a height for the switched display mode stored in advance in such a manner to be linked with the partial display area. The set partial display area is displayed in the switched display mode.

8 Claims, 11 Drawing Sheets

FIG.3

|  | OCTOBER 1 | OCTOBER 2 | OCTOBER 3 | OCTOBER 4 | OCTOBER 5 | OCTOBER 6 | OCTOBER 7 |
|---|---|---|---|---|---|---|---|
| ◆ DATA A | 10.5 | 12.0 | 9.8 | 11.0 | 15.5 | 15.0 | 12.0 |
| ◆ DATA B | 1.0 | 1.5 | 1.3 | 1.2 | 1.8 | 1.5 | 0.7 |
| ◆ DATA C | 3.7 | 8.4 | 0.2 | 0.5 | 6.0 | 12.0 | 5.3 |
| ◆ DATA D | 27.5 | 25.7 | 29.0 | 30.2 | 28.5 | 26.0 | 26.5 |

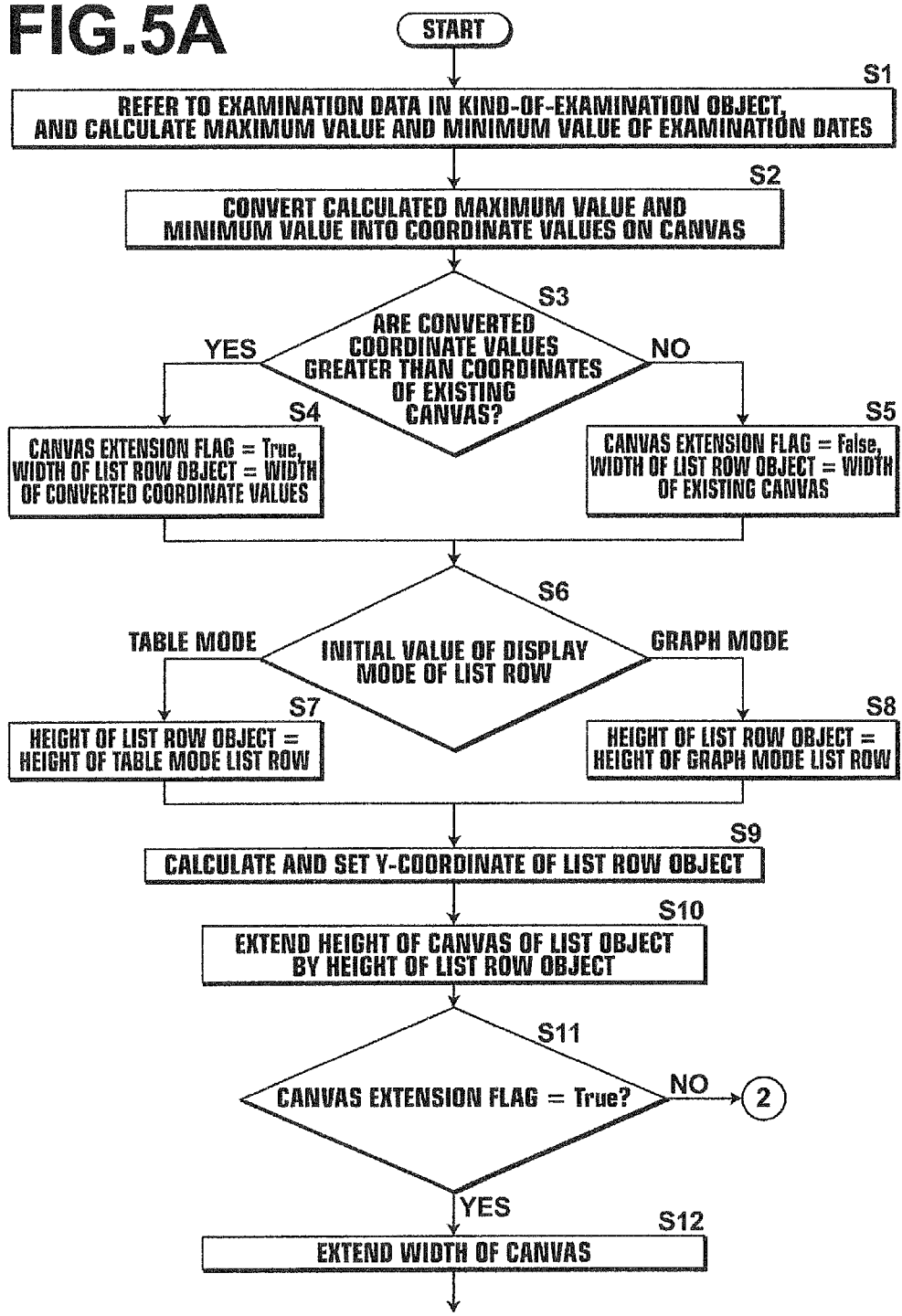

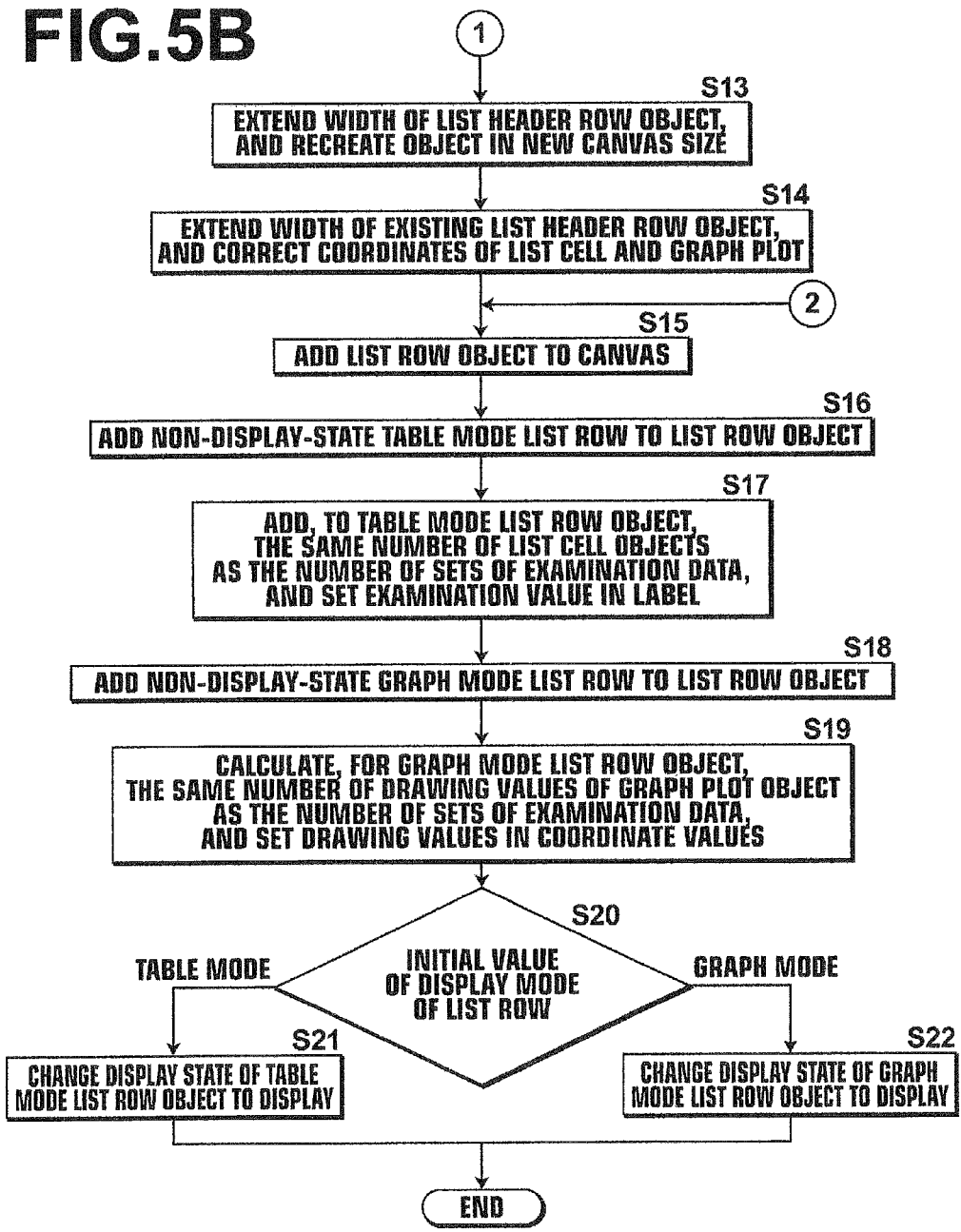

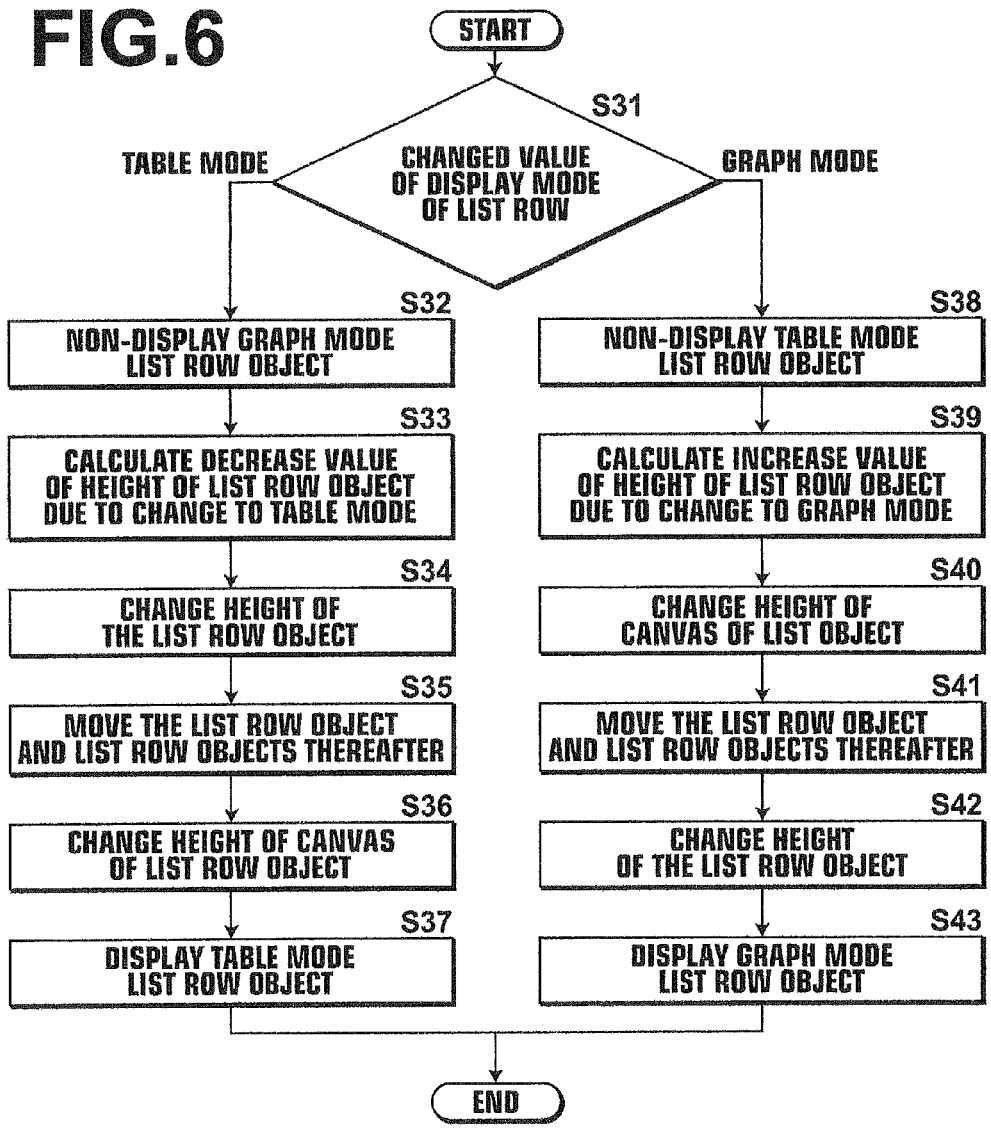

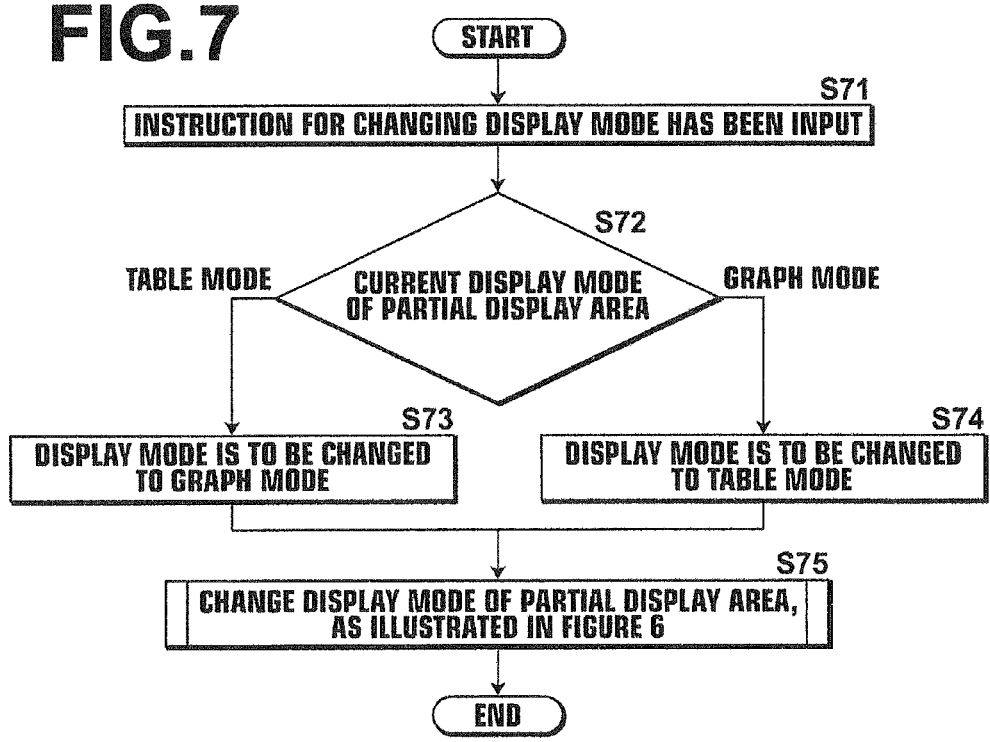

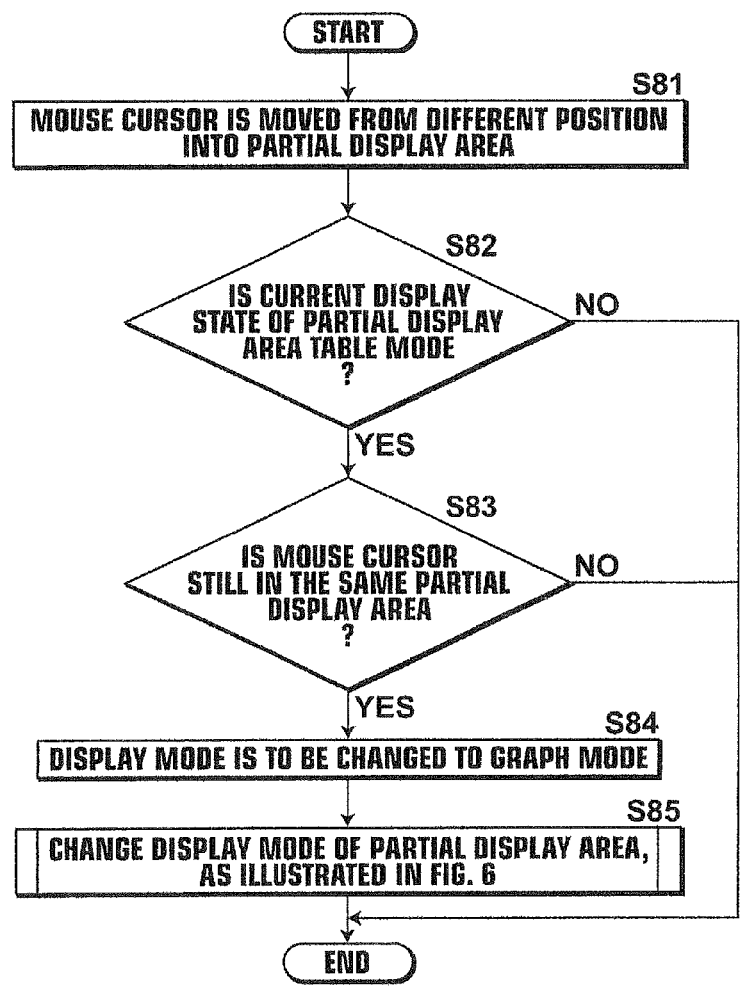

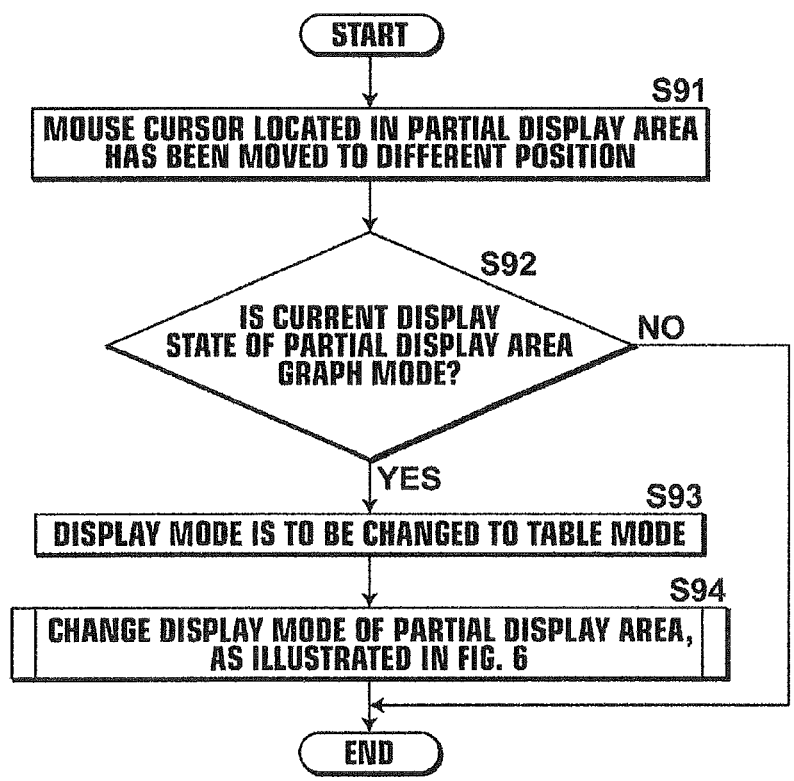

//DATA DISPLAY APPARATUS, METHOD AND PROGRAM, AND DATA STRUCTURE AND RECORDING MEDIUM

BACKGROUND OF THE INVENTION

1. Field of the Invention

The present invention relates to a data display apparatus, method and program for displaying, on a display screen, plural datasets each composed of a set of pieces of numerical value data respectively corresponding to plural values on a variable axis that is common to the plural datasets, and also to a data structure for defining display of the plural datasets on a display screen and a recording medium.

2. Description of the Related Art

When a dataset composed of a set of pieces of numerical value data respectively corresponding to plural values on a variable axis is displayed on a display of a computer, and a fluctuation of the numerical value data with respect to the variable axis is observed, it is possible to more easily and visually recognize the fluctuation by displaying the dataset in a graph mode, such as a line chart, a scatter plot and a bar graph, than by displaying a list of numerical value data in a table mode. Therefore, display of datasets in a graph mode is widely used (please refer to Japanese Unexamined Patent Publication No. 6 (1994)-083880 (Patent Document 1)).

However, display in a graph mode ordinarily needs a larger display area than display in a table mode. Therefore, when there are many data series to be displayed, and all of them are tried to be displayed in a graph mode, some data series are not displayed on the same display screen because the display screen is not large enough, and the characteristic of viewing all data at the same time is damaged. In such a case, the data series that are not displayed may be displayed on the display screen by scrolling the display screen, or by limiting the number of data series displayed on the display screen by switching display/non-display setting for each data series. However, the problem of damaging the characteristic of viewing data at the same time is not solved.

As another approach, plural data series may be superimposed one on another, and displayed in the same graph display area. However, in such a case, there is a problem that it becomes difficult to read each graph as the number of data series superimposed one on another is larger.

Alternatively, display in a table mode, in which many data series can be displayed on the same display screen, may be adopted as basic display, and only a part of the displayed data specified by a user may be displayed in a graph mode in a different display area (a display area different from a display area for a table mode) on the display screen. In such a case, it is possible to obtain the merits of making data series of interest easily recognizable by use of a graph or graphs for the part of data series while many data series are displayed on the display screen.

SUMMARY OF THE INVENTION

Meanwhile, when plural datasets each composed of a set of pieces of numerical value data respectively corresponding to plural values on a variable axis that is common to the plural datasets are displayed on a display screen, and a fluctuation of the numerical value data with respect to the variable axis is observed, there is a demand for performing comparative observation of fluctuations of numerical value data of each dataset with respect to the variable axis to recognize correlation among the datasets. However, in the aforementioned conventional method, display in a graph mode is performed in a display area that is different from a display area for a table mode in a display screen. Therefore, when a user performs comparative observation especially between a dataset displayed in a table mode and a dataset displayed in a graph mode, the user needs to move the directions of his/her eyes or visual lines to alternately observe the display area in a table mode and the display area in a graph mode to find numerical value data corresponding to the same values on the variable axis in a comparison operation. That causes a problem of imposing a heavy burden on the user.

In view of the foregoing circumstances, it is an object of the present invention to provide a data display apparatus, method and program that can quickly switch a display mode for each dataset, and that can display in such a manner that comparison observation is easily performable even between datasets that are displayed in different display modes from each other, and a data structure and a recording medium.

A data display apparatus of the present invention is a data display apparatus for displaying, on a display screen, a plurality of datasets each composed of a set of pieces of numerical value data respectively corresponding to a plurality of values on a variable axis that is common to the plurality of datasets, the apparatus comprising:

a display control means that displays, on the display screen, each of the plurality of datasets in a display mode of a graph mode or a table mode in such a manner that the plurality of datasets are vertically arranged with a horizontal axis representing the variable axis of each of the plurality of datasets coinciding with each other;

a storage means that stores the height of each of a plurality of partial display areas in which the plurality of datasets respectively are displayed by the display control means for each of a case of displaying in a graph mode and a case of displaying in a table mode; and an input receiving means that receives an input of instruction for switching the display mode for at least one of the plurality of partial display areas, wherein the display control means sets the at least one of the plurality of partial display areas for which the input of instruction for switching the display mode has been received by the input receiving means in such a manner that the height of the at least one of the plurality of partial display areas becomes the height of the at least one of the plurality of partial display areas for the switched display mode stored in the storage means, and displays the at least one of the plurality of partial display areas the height of which has been set in the switched display mode.

In the data display apparatus of the present invention, the input receiving means may receive a user input for specifying an arbitrary position in the at least one of the plurality of partial display areas by an input means for specifying an arbitrary position on the display screen, as the input of instruction for switching the display mode for the at least one of the plurality of partial display areas.

In the data display apparatus of the present invention, the input receiving means may receive a user input of keeping, by an input means for operating the position of a cursor on the display screen, the cursor for a predetermined time period or longer in the at least one of the plurality of partial display areas displayed in a table mode, as an input of instruction for switching the display mode for the at least one of the plurality of partial display areas to a graph mode.

In the data display apparatus of the present invention, the input receiving means may receive a user input of moving, by an input means for operating the position of a cursor on the display screen, the cursor from the inside of one of the plurality of partial display areas that is displayed in a graph mode to the outside of the one of the plurality of partial display areas, as an input of instruction for switching the display mode for the one of the plurality of partial display areas to a table mode.

In the data display apparatus of the present invention, the input receiving means may receive a user input of reducing, by an input means for operating the size of the partial display area displayed on the display screen, the size of the at least one of the plurality of partial display areas that is displayed in a graph mode to a size smaller than a threshold that has been set in advance, as an input of instruction for switching the display mode for the at least one of the plurality of partial display areas to a table mode, and receive a user input for increasing, by the input means, the size of the at least one of the plurality of partial display areas that is displayed in a table mode to a size larger than or equal to a threshold, as an input of instruction for switching the display mode for the at least one of the plurality of partial display areas to a graph mode.

In the data display apparatus of the present invention, the display control means may display by assigning values on the variable axis by uniform coordinates or logarithmic coordinates.

A data display method of the present invention is a data display method for displaying, on a display screen, a plurality of datasets each composed of a set of pieces of numerical value data respectively corresponding to a plurality of values on a variable axis that is common to the plurality of datasets, the method comprising the steps of:

displaying, on the display screen, each of the plurality of datasets in a display mode of a graph mode or a table mode in such a manner that the plurality of datasets are vertically arranged with a horizontal axis representing the variable axis of each of the plurality of datasets coinciding with each other;

receiving an input of instruction for switching the display mode for at least one of a plurality of partial display areas in which the plurality of datasets respectively are displayed;

setting the at least one of the plurality of partial display areas for which the input of instruction for switching the display mode has been received so that the height of the at least one of the plurality of partial display areas becomes a height for the switched display mode stored in advance in such a manner to be linked with the at least one of the plurality of partial display areas; and displaying the set at least one of the plurality of partial display areas in the switched display mode.

A data display program of the present invention is a data display program for causing a computer to function as a data display apparatus that displays, on a display screen, a plurality of datasets each composed of a set of pieces of numerical value data respectively corresponding to a plurality of values on a variable axis that is common to the plurality of datasets, the apparatus comprising:

a display control means that displays, on the display screen, each of the plurality of datasets in a display mode of a graph mode or a table mode in such a manner that the plurality of datasets are vertically arranged with a horizontal axis representing the variable axis of each of the plurality of datasets coinciding with each other;

a storage means that stores the height of each of a plurality of partial display areas in which the plurality of datasets respectively are displayed by the display control means for each of a case of displaying in a graph mode and a case of displaying in a table mode; and an input receiving means that receives an input of instruction for switching the display mode for at least one of the plurality of partial display areas, wherein the display control means sets the at least one of the plurality of partial display areas for which the input of instruction for switching the display mode has been received by the input receiving means in such a manner that the height of the at least one of the plurality of partial display areas becomes the height of the at least one of the plurality of partial display areas for the switched display mode stored in the storage means, and displays the at least one of the plurality of partial display areas the height of which has been set in the switched display mode.

A data structure of the present invention is a data structure that defines display of a plurality of datasets, on a display screen, each composed of a set of pieces of numerical value data respectively corresponding to a plurality of values on a variable axis that is common to the plurality of datasets, the data structure, with respect to each of a plurality of partial display areas in which the plurality of datasets respectively are displayed, comprising:

(a) first data that defines, based on a horizontal axis representing the variable axis in a predetermined scale that has been set in such a manner to be common to all of the plurality of partial display areas, the size of a partial display area when a dataset to be displayed in the partial display area is displayed in a table mode;

(b) second data that defines, based on the horizontal axis, the size of the partial display area when the dataset to be displayed in the partial display area is displayed in a predetermined graph mode;

(c) third data that defines whether display in the partial display area is in a table mode or in a graph mode; and (d) fourth data that defines the position of the partial display area on the display screen in such a manner that the partial display area has the size defined in the first data when the third data defines display in a table mode, and the partial display area has the size defined in the second data when the third data defines display in a graph mode, and that all of the partial display areas are vertically arranged with the horizontal axis of each of all of the partial display areas coinciding with each other on the display screen.

Here, the phrase "the size of a partial display area" means the height and the width of the partial display area.

Further, a data display apparatus including a storage means that stores the data structure of the present invention and a display control means that displays, based on the data structure stored in the storage means, plural datasets on a display screen may be provided. In the data display apparatus, the display control means displays each dataset at a position defined in the fourth data about a partial display area in which the dataset is displayed. The partial display area has the size defined in the first data when the third data defines display in a table mode or the size defined in the second data when the third data defines display in a graph mode. Each dataset is displayed in a display mode defined in the third data.

Further, the data display apparatus may include a data processing means. The data processing means receives an input of instruction for changing a display mode for one of the partial display areas, and rewrites the third data about the partial display area so that display in a graph mode is defined when the third data about the partial display area for which a change in the display mode has been instructed defines display in a table mode, or display in a table mode is defined when the third data defines display in a graph mode.

At this time, an input of instruction for changing a display mode may be an input by a user to specify an arbitrary position in a partial display area for which the user is trying to instruct a change in the display mode by an input means for specifying an arbitrary position on a display screen. Alternatively, when the third data about the partial display area for which the user is trying to instruct a change in the display mode defines display in a table mode, the input of instruction may be an input by the user to keep a cursor, by an input means for operating the position of the cursor on a display screen, for a predetermined time period or longer in the partial display area. When the third data about the partial display area for which the user is trying to instruct a change in the display mode defines display in a graph mode, the input of instruction may be an input by the user to move a cursor, by the input means for operating the position of the cursor on a display screen, from an inside of the partial display area to the outside of the partial display area.

Further, the display control means may receive an input of instruction by a user to change the size of one of the partial display areas displayed on the display screen, and display a dataset to be displayed in a partial display area for which a change in the size has been instructed in the partial display area the size of which has been changed. When the third data about the partial display area for which a change in size has been instructed defines display in a graph mode, the data processing means may rewrite the third data about the partial display area so that display in a table mode is defined if the changed size of the partial display area is less than a threshold that has been set in advance. When the third data about the partial display area for which a change in size has been instructed defines display in a table mode, the data processing means may rewrite the third data about the partial display area so that display in a graph mode is defined if the changed size of the partial display area is greater than or equal to a threshold that has been set in advance.

At this time, only the height of the partial display area may be changeable, and the width of the partial display area may be fixed. Alternatively, both of the height and the width may be changeable. When only the height is changeable, the changed height may be regarded as the changed size of the partial display area, and the size may be compared with a threshold (length) that has been set in advance in such a manner to be linked with the partial display area, and rewriting processing of the data may be performed based on the result.

Further, when numerical value data the values of which consecutively increase or decrease in such a manner to exceed a threshold that has been set in advance are present in each dataset, the data processing means may define display in a graph mode in the third data about the partial display area in which the dataset is displayed. When numerical value data the values of which consecutively increase or decrease in such a manner to exceed the threshold are not present in the dataset, the data processing means may define display in a table mode in the third data about the partial display area in which the dataset is displayed.

According to the data display apparatus, method and program of the present invention, when, a plurality of datasets each composed of a set of pieces of numerical value data respectively corresponding to a plurality of values on a variable axis that is common to the plurality of datasets are displayed on a display screen, each of the plurality of datasets is displayed in a display mode of a graph mode or a table mode on the display screen in such a manner that the plurality of datasets are vertically arranged with a horizontal axis representing the variable axis of each of the plurality of datasets coinciding with each other. Further, an input of instruction for switching the display mode for at least one of a plurality of partial display areas in which the plurality of datasets respectively are displayed is received. Further, the at least one of the plurality of partial display areas for which the input of instruction for switching the display mode has been received is set so that the height of the at least one of the plurality of partial display areas becomes a height for the switched display mode stored in advance in such a manner to be linked with the at least one of the plurality of partial display areas. Further, the set at least one of the plurality of partial display areas is displayed in the switched display mode. Therefore, it is possible to provide display in which partial display areas for displaying datasets are vertically arranged with the horizontal axis of each of the datasets coinciding with each other, regardless of the display mode of each dataset in the partial display area. Hence, a user can easily perform comparative observation between datasets just by vertically moving the directions of his/her eyes. Compared with a conventional method in which display in a graph mode is performed in a display area other than the display area in a table mode, it is possible to reduce a burden on a user in comparative observation between datasets.

Further, according to the data display apparatus, method and program of the present embodiment, the height of each of a plurality of partial display areas in which the plurality of datasets respectively are displayed is stored in advance for each of a case of displaying in a graph mode and a case of displaying in a table mode. When an input of instruction for switching the display mode for at least one of the plurality of partial display areas is received, it is possible to obtain and determine the height of the partial display area for which a display mode has been switched with reference to the height stored in such a manner to be linked with the partial display area when the partial display area is displayed in the switched display mode. Compared with a conventional method in which the size of a partial display area is recalculated each time when a display mode is switched, it is possible to switch a display mode with a smaller calculation amount. It is possible to quickly switch a display mode for each dataset.

In the data display apparatus, method and program of the present invention, when the input receiving means receives a user input for specifying an arbitrary position in the at least one of the plurality of partial display areas by an input means for specifying an arbitrary position on the display screen, as the input of instruction for switching the display mode for the at least one of the plurality of partial display areas, the user can instruct change in a display mode by an intuitive operation. Therefore, it is possible to improve convenience of the user.

In the data display apparatus, method and program of the present invention, when the input receiving means receives a user input of keeping, by an input means for operating the position of a cursor on the display screen, the cursor for a predetermined time period or longer in the at least one of the plurality of partial display areas displayed in a table mode, as an input of instruction for switching the display mode for the at least one of the plurality of partial display areas to a graph mode, the user can instruct change in a display mode by an intuitive operation. Therefore, it is possible to improve convenience of the user.

In the data display apparatus, method and program of the present invention, when the input receiving means receives a user input of moving, by an input means for operating the position of a cursor on the display screen, the cursor from the inside of one of the plurality of partial display areas that is displayed in a graph mode to the outside of the one of the plurality of partial display areas, as an input of instruction for switching the display mode for the one of the plurality of partial display areas to a table mode, the user can instruct change in a display mode by an intuitive operation. Therefore, it is possible to improve convenience of the user.

In the data display apparatus, method and program of the present invention, when the input receiving means receives a user input of reducing, by an input means for operating the size of the partial display area displayed on the display screen, the size of the at least one of the plurality of partial display areas that is displayed in a graph mode to a size smaller than a threshold that has been set in advance, as an input of instruction for switching the display mode for the at least one of the plurality of partial display areas to a table mode, and receives a user input for increasing, by the input means, the size of the at least one of the plurality of partial display areas that is displayed in a table mode to a size larger than or equal to a threshold, as an input of instruction for switching the display mode for the at least one of the plurality of partial display areas to a graph mode, the user can instruct change in a display mode by an intuitive operation. Therefore, it is possible to improve convenience of the user.

The data structure of the present invention includes, with respect to each of partial display areas in which datasets respectively are displayed, (a) first data that defines, based on a horizontal axis representing the variable axis in a predetermined scale that has been set in such a manner to be common to all of the plurality of partial display areas, the size of a partial display area when a dataset to be displayed in the partial display area is displayed in a table mode, (b) second data that defines, based on the horizontal axis, the size of the partial display area when the dataset to be displayed in the partial display area is displayed in a predetermined graph mode, (c) third data that defines whether display in the partial display area is in a table mode or in a graph mode, and (d) fourth data that defines the position of the partial display area on the display screen in such a manner that the partial display area has the size defined in the first data when the third data defines display in a table mode, and the partial display area has the size defined in the second data when the third data defines display in a graph mode, and that all of the partial display areas are vertically arranged with the horizontal axis of each of all of the partial display areas coinciding with each other on the display screen. Therefore, when a user tries to switch a display mode for one of the datasets, it is possible to obtain and determine the size of a partial display area in the switched display mode just by rewriting the third data that defines the display mode of the partial display area in which the dataset is displayed and by referring to the first or second data based on the rewritten third data. Hence, it is possible to switch a display mode with a smaller calculation amount, compared with a conventional method in which the size of a partial display area is recalculated each time when a display mode is switched. Further, it is possible to quickly switch a display mode for each dataset.

Further, according to the data structure of the present invention, each partial display area is positioned in such a manner that partial display areas are vertically arranged with the horizontal axis coinciding with each other, regardless of the display mode of a dataset in the partial display area. Therefore, when plural datasets are displayed on a display screen based on the data structure of the present invention, a user can easily perform comparative observation between datasets on the display screen just by vertically moving the directions of his/her eyes. Compared with a conventional method in which display in a graph mode is performed in a display area other than the display area in a table mode, it is possible to reduce a burden on a user in comparative observation between datasets.

In a data display apparatus including a storage means that stores the data structure of the present invention and a display control means that displays, based on the data structure stored in the storage means, plural datasets on a display screen, when the display control means displays each dataset at a position defined in the fourth data about a partial display area in which the dataset is displayed, and the partial display area has the size defined in the first data when the third data defines display in a table mode or the size defined in the second data when the third data defines display in a graph mode, and each dataset is displayed in a display mode defined in the third data, it is possible to provide display in which each partial display area for displaying a dataset is positioned in such a manner that partial display areas are vertically arranged with the horizontal axis coinciding with each other, regardless of the display mode of a dataset in the partial display area. Therefore, a user can easily perform comparative observation between datasets just by vertically moving the directions of his/her eyes. Compared with a conventional method in which display in a graph mode is performed in a display area other than the display area in a table mode, it is possible to reduce a burden on a user in comparative observation between datasets.

When the data display apparatus includes a data processing means that receives an input of instruction for changing a display mode for one of the partial display areas, and rewrites the third data about the partial display area so that display in a graph mode is defined when the third data about the partial display area for which a change in the display mode has been instructed defines display in a table mode, or display in a table mode is defined when the third data defines display in a graph mode, it is possible to obtain and determine the size of a partial display area in the switched display mode just by referring to the first or second data based on the rewritten third data. Hence, it is possible to switch a display mode with a smaller calculation amount, compared with a conventional method in which the size of a partial display area is recalculated each time when a display mode is switched. Further, it is possible to quickly switch a display mode for each dataset.

In the data display apparatus, when numerical value data the values of which consecutively increase or decrease in such a manner to exceed a threshold that has been set in advance are present in each dataset, the data processing means may define display in a graph mode in the third data about the partial display area in which the dataset is displayed. When numerical value data the values of which consecutively increase or decrease in such a manner to exceed the threshold are not present in the dataset, the data processing means may define display in a table mode in the third data about the partial display area in which the dataset is displayed. In such a case, it is possible to display a dataset satisfying a predetermined numerical value condition that has been set in advance in such a manner that a user can more easily observe the dataset.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

BRIEF DESCRIPTION OF THE DRAWINGS

FIG. 3 is a diagram illustrating an example of display of object data by a data display apparatus of the present invention (No. 1);

FIG. 5A is a flow chart illustrating processing performed when a dataset to be displayed is added to the data illustrated in FIG. 2;

FIG. 5B is a flow chart illustrating processing performed when the dataset to be displayed is added to the data illustrated in FIG. 2;

FIG. 6 is a flow chart illustrating processing performed when setting of a display mode for a specific dataset is changed in the data illustrated in FIG. 2;

FIG. 7 is a flow chart illustrating processing performed when a display mode for a partial display area is changed (No. 1);

FIG. 8 is a flow chart illustrating processing performed when a display mode for a partial display area is changed (No. 2);

FIG. 9 is a flow chart illustrating processing performed when a display mode for a partial display area is changed (No. 3)

DESCRIPTION OF THE PREFERRED EMBODIMENTS

Figure 1:
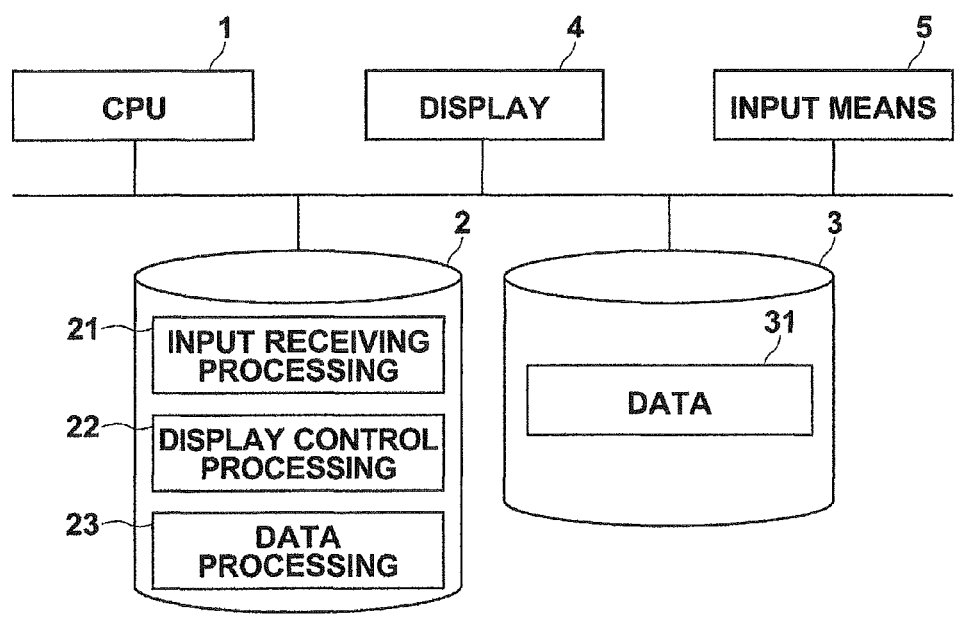
FIG. 1 is a schematic block diagram illustrating the configuration of a data display apparatus according to an embodiment of the present invention.

Hereinafter, embodiments of the present invention will be described with reference to drawings. FIG. 1 is a schematic block diagram illustrating the configuration of a data display apparatus according to an embodiment of the present invention. The data display apparatus according to an embodiment of the present invention is a computer (including a smartphone, a tablet computer and the like). The data display apparatus includes a CPU 1 and a memory 2. Further, the data display apparatus includes a storage means 3, such as an HDD and an SSD. Further, a display 4 and an input means 5, such as a mouse and a keyboard, are connected to the data display apparatus.

The storage means 3 stores data 31 having a data structure of the present invention. The memory 2 stores programs that define various kinds of processing, such as input receiving processing 21, display control processing 22 and data processing 23, to be performed by the CPU 1. The computer functions as an input receiving means, a display control means and a data processing means when the CPU 1 performs each of the aforementioned processing based on the programs stored in the memory 2. Here, the display control processing is processing for displaying, based on the data 31 stored in the storage means 3, plural datasets on a display screen of the display 4. The data processing is processing for adding data to the data 31 stored in the storage means 3, deleting data from the data 31, rewriting data on the data 31, and the like.

Figure 2:
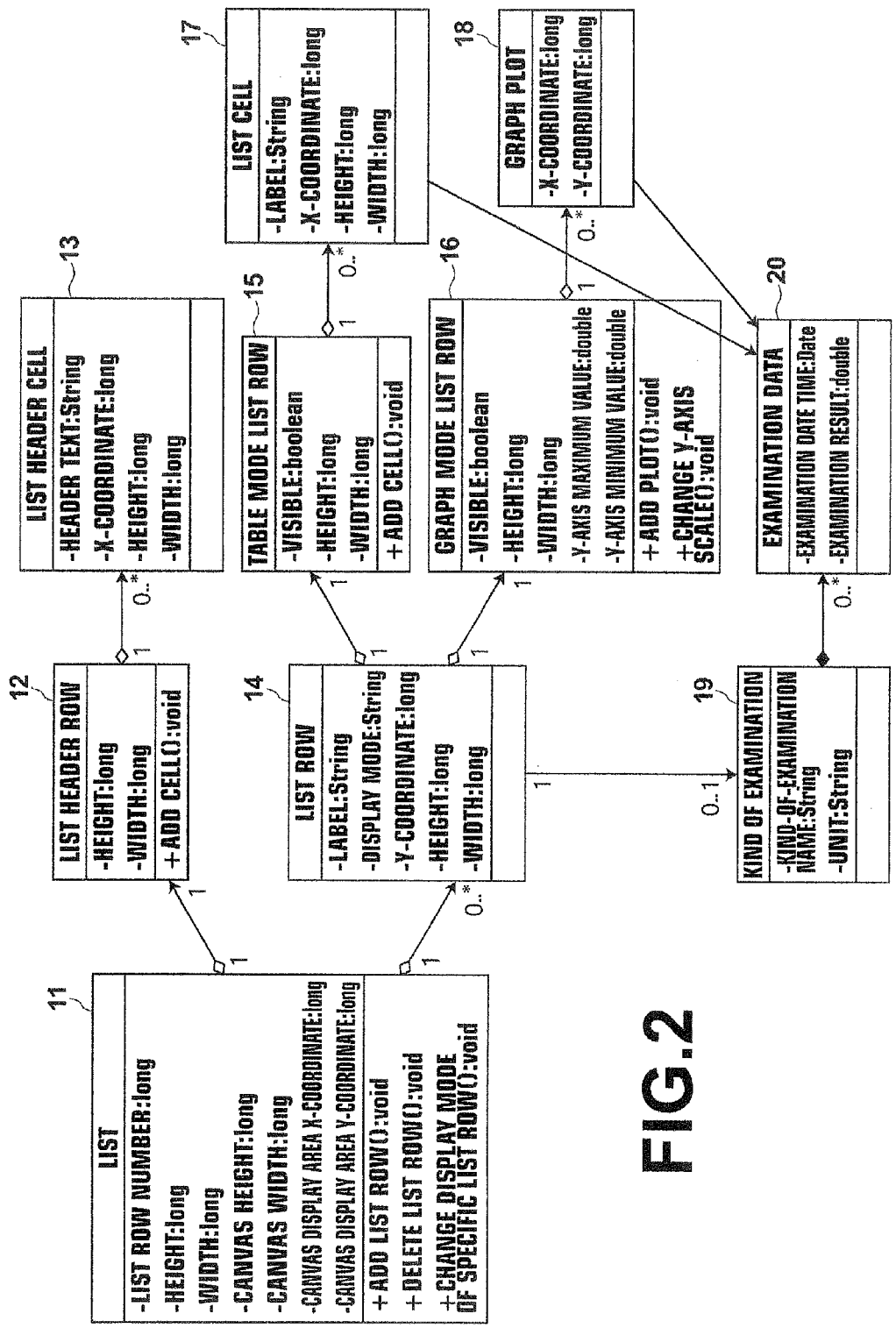
FIG. 2 is a class diagram illustrating a data structure.

FIG. 2 is a UML class diagram illustrating the structure of the data 31. As illustrated in FIG. 2, the data 31 includes a list object 11, a list header row object 12, a list header cell object 13, a list row object 14, a table mode list row object 15, a graph mode list row object 16, a list cell object 17, a graph plot object 18, a kind-of-examination object 19, and an examination data object 20.

In the data 31, each partial display area, which displays each dataset, is managed as a list row. The list object 11 defines the whole list that unifies all list rows. The list object 11 includes information about the height and the width of a list display area in which the whole list is displayed, and information about the height and the width of a canvas area in which drawing is performed in the list display area and X-coordinates and Y-coordinates of the canvas area with respect to an origin at an upper left position of the canvas. Further, the list object 11 has a reference link to a list header row object 12 and a reference link or links to zero or one or more list row objects 14.

The list header row object 12 defines a header row of the list, and includes information about the height and the width of a header row display area in which the header row is displayed. The list header row object 12 has a reference link or links to zero or one or more list header cell objects 13. The list header cell object 13 defines a header cell, and includes information about a header text to be displayed in the header cell.

A list row object 14 defines a partial display area. The list row object 14 has information about a label of a data series to be displayed in the partial display area, a display mode (corresponding to third data) defining whether display in the partial display area is performed in a table mode or in a graph mode, and the position (Y-coordinate with respect to the origin at the upper left position) and the size (height and width) of the partial display area. As the position of the partial display area, the position of the partial display area on the display screen defined in such a manner that each of all partial display areas has a size defined in the list row object 14 and that all the partial display areas are vertically arranged in the display screen with a horizontal axis of each of the partial display areas coinciding with each other is set.

The list row object 14 has a reference link to a table mode list row object 15 and a reference link to a graph mode list row object 16. The table mode list row object 15 defines a case of displaying the partial display area in a table mode. The table mode list row object 15 includes information about a flag defining the display/non-display state of the object, and the height and the width (corresponding to first data) of the partial display area when a dataset to be displayed is displayed in the partial display area in a table mode with respect to a horizontal axis having a predetermined scale that is common to all of the partial display areas. Further, the table mode list row object 15 has a reference link or links to zero or one or more list cell objects 17.

The list cell object 17 defines a list cell into which each piece of numerical value data is inserted. The list cell object 17 includes information about a label of a data series to be displayed in the partial display area, and the height and the width of the list cell area and X-coordinate of the list cell area with respect to the origin at the upper left position. The list cell object 17 has a reference link to the examination data object 20. Further, each examination data object 20 maintains information about an examination data time and an examination result that define each piece of numerical value data constituting a dataset to be displayed.

The graph mode list row object 16 defines a case of displaying the partial display area in a graph mode. The graph mode list row object 16 includes information about a flag defining the display/non-display state of the object, and the height and the width (corresponding to second data) of the partial display area when a dataset to be displayed is displayed in the partial display area in a graph mode with respect to the horizontal axis. Further, the graph mode list row object 16 has a reference link or links to zero or one or more graph plot object objects 18.

The graph plot object 18 defines a plot representing each piece of numerical value data in a graph. The graph plot object 18 includes X-coordinates and Y-coordinates of a plot. The graph plot object 18 has a reference link to the examination data object 20. Further, coordinate values calculated based on the examination date time and the examination result in the examination data object 20 are set as X-coordinates and Y-coordinates of the plot.

Further, the list row object 14 has a reference link to zero or one kind-of-examination object 19. The kind-of-examination object 19 is a class corresponding to a dataset (an examination result of sample examination), and maintains zero or one or more examination data objects 20. The kind-of-examination object 19 stores the kind of examination, for example, such as a red blood cell number, a white blood cell number, and hematocrit. Further, the examination data object 20 stores an examination value of the examination.

Next, processing performed by the data display apparatus will be described. A display control means displays, on a display screen of the display 4, plural datasets based on the data 31 stored in the storage means 3. The display control means displays each dataset to be displayed in a partial display area the position and the size of which are defined in the list row object 14 corresponding to the dataset. The display control means displays the dataset in a display mode defined in the list row object 14.

Figure 4:
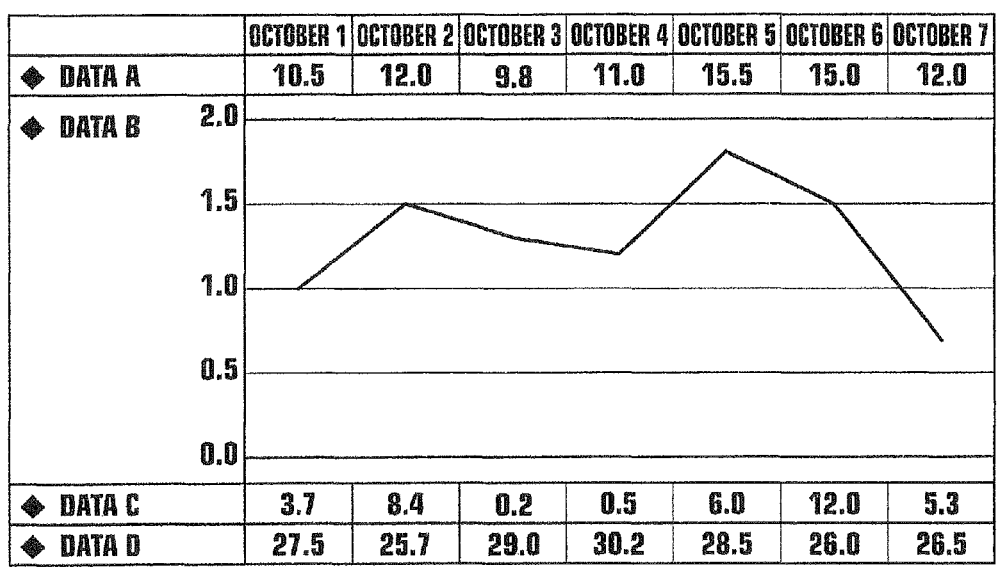
FIG. 4 is a diagram illustrating an example of display of object data by a data display apparatus of the present invention (No. 2)

FIGS. 3 and 4 illustrate examples of display in which four data series "DATA A" through "DATA D" are displayed on the display device by the display control means. Here, it is assumed that each dataset is obtained by measuring numerical value data every day from October 1 through October 7, and stored in such a manner to be linked with dates of measurement of the numerical value data. FIG. 3 illustrates an example of display when a table mode is set as a display mode in all of list row objects 14 corresponding to "DATA A" through "DATA D". FIG. 4 illustrates an example of display when a table mode is set as a display mode in each of list row objects 14 corresponding to "DATA A", "DATA C" and "DATA D", and a graph mode is set as a display mode in a list row object 14 corresponding to "DATA B". In this example, the number of datasets is four so as to be easily understood, but the number of datasets to be displayed may be several tens or hundreds in some cases.

The data processing means adds data to the data 31 stored in the storage means 3, deletes data from the data 31, rewrites data on the data 31, and the like. Next, with reference to the flow charts of FIGS. 5A and 5B, a flow of processing performed when a dataset to be displayed is added to the data 31 illustrated in FIG. 2 by the data processing means will be described. The data processing means receives an input of instruction for adding a list row, which specifies a kind-of-examination object 19 of a dataset to be added. First, the data processing means refers to examination data 20 through the specified kind-of-examination object 19, and calculates a maximum value and a minimum value on the examination dates (step S1), and the maximum value and the minimum value are converted into coordinate values of a canvas (step S2).

Then, the data processing means checks whether the converted coordinate values exceed the canvas size of the existing list object 11 (step S3). If the converted coordinate values exceed the canvas size, a canvas extension flag is turned on, and the width of the converted coordinate values is set as the width of the list row object 14 (step S4). In contrast, in step S3, if the converted coordinate values do not exceed the canvas size of the existing list object 11, the extension flag is turned off, and the width of the existing canvas is set as the width of the list row object 14 (step S5).

Next, an initial value (default value) set as the display mode of a new list row object 14 is checked (step S6). If the initial value is a table mode, the height of a table mode list row object 15 to which the list row object 14 refers is set as the height of the list row object 14 (step S7). In contrast, if the initial value set as a display mode is a graph mode, the height of a graph mode list row object 16 to which the list row object 14 refers is set as the height of the list row object 14 (step S8). Here, a default value that has been set in advance may be used as the initial value of the display mode of the list row object 14. Alternatively, judgment may be made as to whether a dataset to be displayed in the partial display area satisfies a predetermined condition, and a value determined based on the result of judgment may be used. For example, when numerical value data the values of which consecutively increase or decrease in such a manner to exceed a threshold that has been linked with the dataset in advance are present, a graph mode may be used as the initial value. When such numerical value data are not present, a table mode may be used as the initial value.

Next, a position for starting drawing a new list row object 14 is calculated based on the information about the existing list row object 14, and the calculated value is set as the Y-coordinate value of the new list row object 14 (step S9). Further, the height of the canvas of the list object 11 is extended by a length corresponding to the height of the new list row object 14 (step S10).

Then, an extension flag of the campus is checked. If the extension flag is on (step S11), the width of the canvas of the list object 11 is extended (step S12). Further, the width of the list header row object 12 is extended, and a header object 13 under the list header row object 12 is recreated (step S13). Further, the width of the existing list row object 14 is extended, and the coordinates of the list cell object 17 and the graph plot object 18 under the list row object 14 are modified (step S14). Further, the list row object 14 is added to the canvas of the list object 11 (step S15).

Next, a table mode list row object 15 in a non-display state is added to the list row object 14 (step S16). A list cell object 17 corresponding to an examination data object 20 included in the kind-of-examination object 19 is added to the table mode list row object 15. In that case, a position for starting drawing of the list cell object 17 is calculated based on the width of the list cell and the number of an object or objects to be drawn, and the calculated value is input to X-coordinate. Further, an examination result is input to a label (step S17).

Then, a graph mode list row object 16 in a non-display state is added to the list row object 14 (step S18). A graph plot object 18 corresponding to an examination data object 20 included in the kind-of-examination object 19 is added to the graph mode list row object 16. In that case, coordinates for drawing the graph plot object 17 are calculated based on examination dates/time and examination results, and the calculated values are input to X-coordinate and Y-coordinate (step S19).

Then, an initial value set in the display mode of the list row object 14 is checked (step S20). If the display mode is a table mode, the display state of the table mode list row object 15 is changed to a display state (step S21). If the initial value set in the display mode is a graph mode, the display state of the graph mode list row object 16 is changed to a display state (step S22), and processing ends.

When the data processing means receives an input of instruction for changing a display mode for one of partial display areas, the data processing means rewrites data 31, and changes setting of a display mode for the partial display area for which a change in the display mode has been instructed. Next, with reference to a flow chart illustrated in FIG. 6, a flow of processing performed when the data processing means changes setting of a display mode for a specific dataset will be described.

The data processing means receives an input of instruction for changing a display mode for a specific partial display area by an input receiving means. In response to setting of a change value of a display mode of a list row for the partial display area, first, the data processing means checks whether the change value is a table mode or a graph mode (step S31). In step S31, if the change value of the display mode of the list row is a table mode, the display state of the graph mode list row object 16 is changed to a non-display state (step S32). Then, a decrease value of the height of the list row object 14 due to change to a table mode is calculated (step S33). The height of the list row object 14 is reduced by a length corresponding to the calculated decrease value (step S34), and the position of each of partial display areas defined in all of the list row object 14 and list row objects thereafter is moved up by a length corresponding to the decrease value (step S35). Further, the height of a canvas of the list object 11 is also reduced by a length corresponding to the decrease value (step S36). The display state of the table mode list row object 15 of the list row object 14 is changed to a display state (step S37), and processing ends.

In contrast, in step S31, if the change value of the display mode of the list row is a graph mode, the display state of the table mode list row object 15 is changed to a non-display state (step S38). Then, an increase value of the height of the list row object 14 due to change to a graph mode is calculated (step S39). The height of a canvas of the list object 11 is increased by a length corresponding to the calculated increase value (step S40), and the position of each of partial display areas defined in all of the list row object 14 and list row objects thereafter is moved down by a length corresponding to the increase value (step S41). Further, the height of the list row object 14 is increased by a length corresponding to the increase value (step S42). The display state of the graph mode list row object of the list row object is changed to a display state (step S43), and processing ends.

When the data 31 are rewritten in this manner, the display control means updates display on the display screen based on data 31 that has been rewritten.

Specifically, as illustrated in a flow chart of FIG. 7, the input receiving means receives a user input specifying an arbitrary position in one of partial display areas by the input means 5 (step S71). The display control means judges whether the current display mode of the partial display area is a table mode or a graph mode (step S72). If the display control means judges that the current display mode is a table mode, the data processing means sets a graph mode, as a change value of the display mode of the list row for the partial display area (step S73), and continues to perform processing illustrated in the flow chart of FIG. 6 (step S75). In contrast, in step S72, if the display control means judges that the current display mode is a graph mode, the data processing means sets a table mode, as a change value of the display mode of the list row for the partial display area (step S74), and continues to perform processing illustrated in the flow chart of FIG. 6 (step S75).

For example, when a user clicks mark ♦ of "DATA B" in the table of FIG. 3 displayed on the display screen, the data processing means rewrites the display mode of the list row object 14 so that the display mode of "DATA B" is changed to a graph mode. Further, the display control means updates the display screen based on the rewritten display mode of the list row object 14. Accordingly, only "DATA B" is developed, as illustrated in FIG. 4, and is switched to graph display.

As illustrated in FIG. 3 and FIG. 4, according to the data display apparatus of the present invention, each of partial display areas is positioned in such a manner that the partial display areas are vertically arranged with its horizontal axis constantly coinciding with each other, regardless of the display mode of a dataset in each of the partial display areas. Therefore, a user can easily perform comparative observation between datasets just by vertically moving the directions of his/her eyes.

Further, the data processing means may include a function of rewriting data so that the display mode of a partial display area is changed from a table mode to a graph mode based on a user input of keeping a cursor of a mouse for a predetermined time period or longer in the partial display area displayed in a table mode. Further, the data processing means may include a function of rewriting data so that the display mode of a partial display area is changed from a graph mode to a table mode based on a user input of moving a cursor from the inside of a partial display area that is displayed in a graph mode to the outside of the partial display area.

For example, as the flow chart of FIG. 8 illustrates, when the input receiving means receives a user input of moving the position of a cursor from the outside of one of partial display areas to the inside of the one of partial display areas on a display screen by the input means 5 (step S81), the display control means judges whether the current display mode of the partial display area is a table mode or not (step S82). If the display control means judges that the current display mode is a table mode, the input receiving means further judges whether the cursor of a mouse is kept present in the same partial display area for a certain time period (step S83). If the input receiving means judges that the cursor of the mouse is kept present in the same partial display area for the certain time period, the data processing means may set a graph mode, as a change value of the display mode of the list row, for the partial display area (step S84), and continue to perform processing in the flow chart of FIG. 6 (step S85). In this case, if the current display mode is judged as a graph mode in step S82, or if the cursor of the mouse is moved to the outside of the partial display area before the certain time period passes in step S83, processing ends at that point.

Further, as the flow chart of FIG. 9 illustrates, when the input receiving means receives a user input of moving the position of a cursor from the inside of one of partial display areas to the outside of the partial display area on a display screen by the input means 5 (step S91), the display control means judges whether the current display mode of the partial display area is a graph mode or not (step S92). If the display control means judges that the current display mode is a graph mode, the data processing means may set a table mode, as a change value of the display mode of the list row, for the partial display area (step S93), and continue to perform processing in the flow chart of FIG. 6 (step S94). In this case, if the current display mode is judged as a table mode in step S92, processing ends at that point.

Further, the data processing means may include a function for rewriting data in the following manner. When the data processing means receives a user input of an instruction for changing the size of one of partial display areas displayed on a display screen, the data processing means rewrites data so that setting of the size of the partial display area becomes the changed size. Further, if the instruction is an instruction to change the size of a partial display area displayed in a graph mode, and the changed size is less than a threshold that has been set in advance, the data processing means rewrites data so that the display mode of the partial display area is changed from a graph mode to a table mode. In contrast, if the instruction is an instruction to change the size of a partial display area displayed in a table mode, and the changed size is greater than or equal to a threshold that has been set in advance, the data processing means rewrites data so that the display mode of the partial display area is changed from a table mode to a graph mode.

Figure 10:
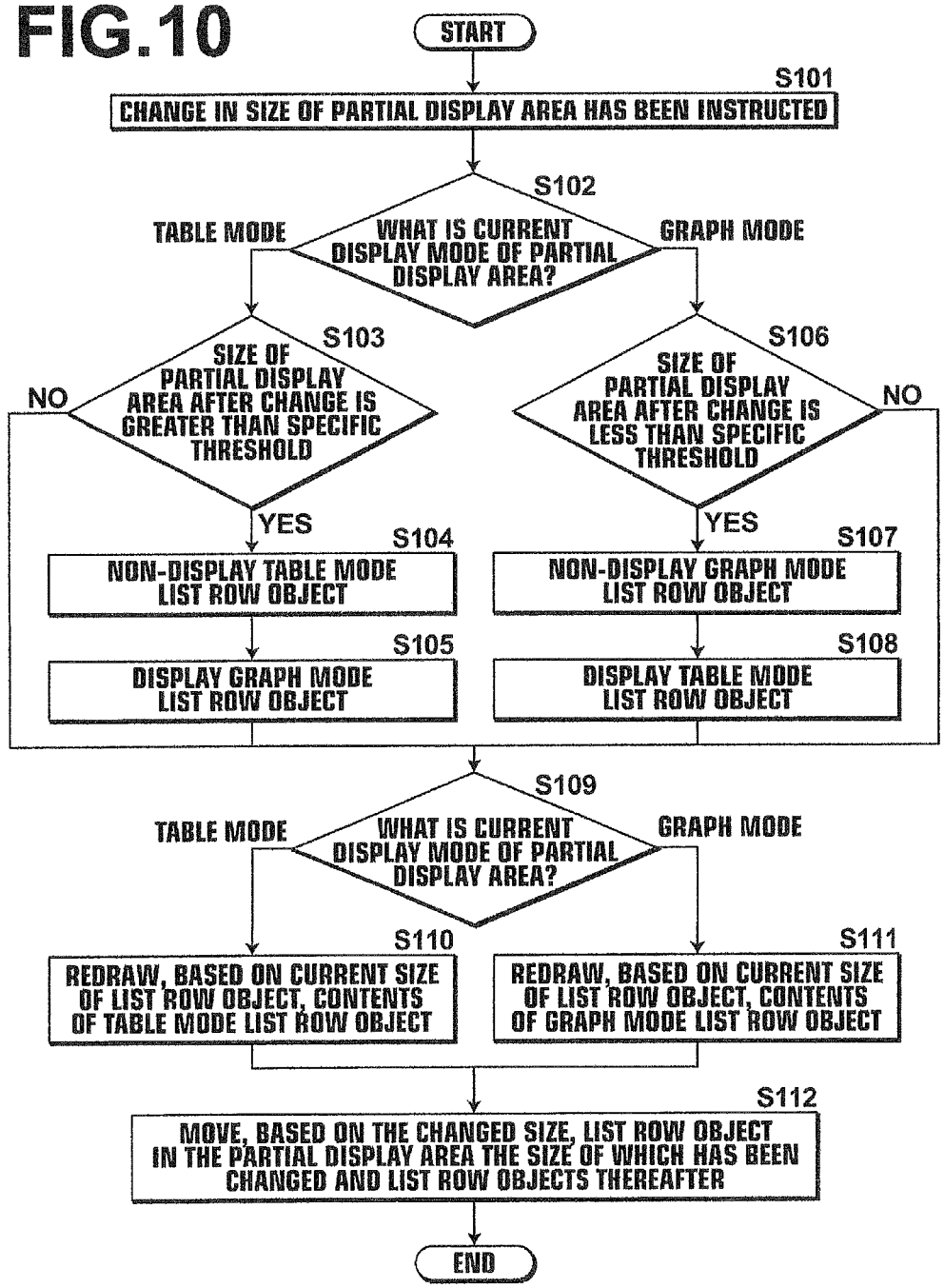
FIG. 10 is a flow chart illustrating processing performed when a display mode for a partial display area is changed (No. 4).

For example, as illustrated in a flow chart of FIG. 10, when the input receiving means receives an input of instruction for changing the size of an area for one of partial display areas by the input means 5, specifically, changing the size by selecting and dragging the frame of the partial display area (step S101), the display control means judges whether the current display mode of the partial display area is a table mode or a graph mode (step S102). If the display control means judges that the current display mode is a table mode, the display control means further judges whether the size of the partial display area changed based on the instruction in step S101 is larger than a threshold that has been set in advance (step S103). If the display control means judges that the size of the changed partial display area is larger than the threshold that has been set in advance, the display control means changes the display state of the table mode list row object 15 to a non-display state (step S104). Further, the display control means changes the display state of the graph mode list row object 16 to a display state (step S105), and proceeds to processing of step S109. Meanwhile, if the display control means judges that the size of the changed partial display area is not larger than the threshold that has been set in advance, processing proceeds directly to step S109.

In contrast, in step S102, if the display control means judges that the current display mode is a graph mode, the display control means further judges whether the size of the partial display area changed based on the instruction in step S101 is smaller than a threshold that has been set in advance (step S106). If the display control means judges that the size of the changed partial display area is smaller than the threshold that has been set in advance, the display control means changes the display state of the graph mode list row object 16 to a non-display state (step S107), and changes the display state of the table mode list row object 15 to a display state (step S108), and proceeds to processing in step S109. Meanwhile, in step 106, if it is judged the size of the changed partial display area is not smaller than the threshold that has been set in advance, processing proceeds directly to step S109.

In step S109, the display control means judges whether the current display mode of the partial display area for which an instruction for changing the size was received in step S101 is a table mode or a graph mode (step S109). If the display control means judges that the current display mode is a table mode, the display control means displays the table mode list row object 15 and the list cell object 17 included in the table mode list row object 15 in the instructed size of the partial display area on the display screen (step S110), and processing proceeds to step S112. In contrast, in step S109, if the display control means judges that the current display mode is a graph mode, the display control means displays the graph mode list row object 16 and the list cell object 17 included in the graph mode list row object 16 in the instructed size of the partial display area on the display screen (step S111), and processing proceeds to step S112.

In step S112, the display control means moves each of a list row object or objects 14 located under the partial display area for which an instruction for changing the size has been received in the following manner. If the size of the partial display area changed by the instruction in step S101 is larger than the size of the display area before change, each of the list row object or objects 14 under the partial display area are moved down, and displayed on the display screen. In contrast, if the size of the partial display area changed by the instruction in step S101 is smaller than the size of the display area before change, each of the list row object or objects 14 under the partial display area are moved up, and displayed on the display screen (step S112). Then, processing ends.

The present invention has remarkable advantageous effects in observation of a fluctuation of values with respect to a variable axis, and especially, when many kinds of data must be handled at the same time on the same display screen. An example is observation of a course of change in the results of examination performed on a patient. In medical fields, examination on a sample, such as blood, is often performed, as a means for observing the condition of a patient. When sample examination is regularly performed, and a change in the results of examination in time is observed, it is possible to estimate the physical condition of the patient, and to judge the efficacy of treatment.

Ordinarily, in a sample examination, plural measurement results are obtainable in one examination, depending on the method of measurement. For example, in a blood test, plural test results, such as platelets, the number of red blood cells, the number of white blood cells, blood cell count, hemoglobin, hematocrit, MCV, MCH, and MCHC, are obtainable. Cases in which 100 or more kinds of examination results in total are present for a patient are not rare. When data on such a patient who has so many examination results are displayed, if data are displayed in a graph or graphs, the display area becomes extremely large, and that damages the convenience of a user. Therefore, in such a case, there is a need for displaying data in a table mode in such a manner to include as many pieces of data as possible, while displaying a specific examination result of interest in a graph mode to observe a course of change in the result, because the specific examination result is an extremely important data for the patient. The present invention is effective especially for such a case.

In the embodiments of the present invention, cases of applying the data structure and the data display apparatus of the present invention to a case of displaying medical examination data on a display screen have mainly been described. However, application of the present invention is not limited to medical examination data. The present invention may be applied to a case of displaying, on a display screen, plural datasets each composed of a set of pieces of numerical value data respectively corresponding to plural values on a variable axis that is common to the plural datasets. For example, the present invention may be applied to a case of displaying, on a display screen, a record of weight and height and a record of a pedometer or the like for management of health, a household account book, a financial management sheet for accounting, temperature and humidity for weather forecasting, and the like.

What is claimed is:

1. A data display apparatus for displaying, on a display screen, a plurality of datasets each composed of a set of pieces of numerical value data respectively corresponding to a plurality of values on a variable axis that is common to the plurality of datasets, the apparatus comprising:

a display control unit that displays, on the display screen, each of the plurality of datasets in a display mode of a graph mode or a table mode in such a manner that the plurality of datasets are vertically arranged with a horizontal axis representing the variable axis of each of the plurality of datasets coinciding with each other;

a storage unit that stores the height of each of a plurality of partial display areas in which the plurality of datasets respectively are displayed by the display control unit for each of a case of displaying in a graph mode and a case of displaying in a table mode; and an input receiving unit that receives an input of instruction for switching the display mode for at least one of the plurality of partial display areas, wherein the display control unit sets the at least one of the plurality of partial display areas for which the input of instruction for switching the display mode has been received by the input receiving unit in such a manner that the height of the at least one of the plurality of partial display areas becomes the height of the at least one of the plurality of partial display areas for the switched display mode stored in the storage unit, and displays the set at least one of the plurality of partial display areas in the switched display mode.

2. The data display apparatus, as defined in claim 1, wherein the input receiving unit receives a user input for specifying an arbitrary position in the at least one of the plurality of partial display areas by an input unit for specifying an arbitrary position on the display screen, as the input of instruction for switching the display mode for the at least one of the plurality of partial display areas.

3. The data display apparatus, as defined in claim 1, wherein the input receiving unit receives a user input of keeping, by an input unit for operating the position of a cursor on the display screen, the cursor for a predetermined time period or longer in the at least one of the plurality of partial display areas displayed in a table mode, as an input of instruction for switching the display mode for the at least one of the plurality of partial display areas to a graph mode.

4. The data display apparatus, as defined in claim 1, wherein the input receiving unit receives a user input of moving, by an input unit for operating the position of a cursor on the display screen, the cursor from the inside of one of the plurality of partial display areas that is displayed in a graph mode to the outside of the one of the plurality of partial display areas, as an input of instruction for switching the display mode for the one of the plurality of partial display areas to a table mode.

5. The data display apparatus, as defined in claim 1, wherein the input receiving unit receives a user input of reducing, by an input unit for operating the size of the partial display area displayed on the display screen, the size of the at least one of the plurality of partial display areas that is displayed in a graph mode to a size smaller than a threshold that has been set in advance, as an input of instruction for switching the display mode for the at least one of the plurality of partial display areas to a table mode, and receives a user input for increasing, by the input unit, the size of the at least one of the plurality of partial display areas that is displayed in a table mode to a size larger than or equal to a threshold, as an input of instruction for switching the display mode for the at least one of the plurality of partial display areas to a graph mode.

6. The data display apparatus, as defined in claim 1, wherein the display control unit displays by assigning values on the variable axis by uniform coordinates or logarithmic coordinates.

7. A non-transitory computer readable recording medium storing therein a data display program for causing a computer to function as a data display apparatus that displays, on a display screen, a plurality of datasets each composed of a set of pieces of numerical value data respectively corresponding to a plurality of values on a variable axis that is common to the plurality of datasets, the apparatus comprising:

a display control unit that displays, on the display screen, each of the plurality of datasets in a display mode of a graph mode or a table mode in such a manner that the plurality of datasets are vertically arranged with a horizontal axis representing the variable axis of each of the plurality of datasets coinciding with each other;

a storage unit that stores the height of each of a plurality of partial display areas in which the plurality of datasets respectively are displayed by the display control unit for each of a case of displaying in a graph mode and a case of displaying in a table mode; and an input receiving unit that receives an input of instruction for switching the display mode for at least one of the plurality of partial display areas, wherein the display control unit sets the at least one of the plurality of partial display areas for which the input of instruction for switching the display mode has been received by the input receiving unit in such a manner that the height of the at least one of the plurality of partial display areas becomes the height of the at least one of the plurality of partial display areas for the switched display mode stored in the storage unit, and displays the set at least one of the plurality of partial display areas in the switched display mode.

8. A non-transitory computer readable recording medium storing therein a data structure that defines display of a plurality of datasets, on a display screen, each composed of a set of pieces of numerical value data respectively corresponding to a plurality of values on a variable axis that is common to the plurality of datasets, the data structure, with respect to each of a plurality of partial display areas in which the plurality of datasets respectively are displayed, comprising:

(a) first data that defines, based on a horizontal axis representing the variable axis in a predetermined scale that has been set in such a manner to be common to all of the plurality of partial display areas, the size of a partial display area when a dataset to be displayed in the partial display area is displayed in a table mode;

(b) second data that defines, based on the horizontal axis, the size of the partial display area when the dataset to be displayed in the partial display area is displayed in a predetermined graph mode;

(c) third data that defines whether display in the partial display area is in a table mode or in a graph mode; and (d) fourth data that defines the position of the partial display area on the display screen in such a manner that the partial display area has the size defined in the first data when the third data defines display in a table mode, and the partial display area has the size defined in the second data when the third data defines display in a graph mode, and that all of the partial display areas are vertically arranged with the horizontal axis of each of all of the partial display areas coinciding with each other on the display screen.

* * * * *